United States Patent
Du et al.

(10) Patent No.: US 6,901,104 B1
(45) Date of Patent: May 31, 2005

(54) WIRLESS NETWORK

(75) Inventors: Yonggang Du, Aachen (DE);
Christoph Herrmann, Aachen (DE)

(73) Assignee: Koninklijke Philips Electronics N.V., Eindhoven (NL)

(*) Notice: Subject to any disclaimer, the term of this patent is extended or adjusted under 35 U.S.C. 154(b) by 0 days.

(21) Appl. No.: 09/451,268

(22) Filed: Nov. 30, 1999

(30) Foreign Application Priority Data

Nov. 30, 1998 (DE) .................................. 198 55 242

(51) Int. Cl.[7] .......................... H04B 1/707; H04L 7/00
(52) U.S. Cl. .................. 375/142; 375/144; 375/148; 375/150; 375/342; 375/343; 375/356; 375/152; 375/143
(58) Field of Search .............................. 375/140, 141, 375/142, 144, 145, 147, 148, 149, 150, 342, 343, 356, 152, 143; 370/437, 449, 458, 459, 461, 462

(56) References Cited

U.S. PATENT DOCUMENTS 5,699,389 A * 12/1997 Beladi et al. ............... 375/371
6,356,607 B1 * 3/2002 Scott et al. .................. 375/354
6,504,835 B1 * 1/2003 Menzel et al. .............. 370/345
6,546,062 B1 * 4/2003 Du et al. ..................... 375/342

FOREIGN PATENT DOCUMENTS

WO      WO 9823104 A2 *  5/1998   ............ H04Q/7/22

* cited by examiner

Primary Examiner—Young T. Tse
Assistant Examiner—David B. Lugo

(57) ABSTRACT

A wireless network is disclosed including at least one base station and a plurality of assigned terminals for exchanging user data and control data. The base station is arranged for transmitting the start time of at least one signaling sequence of at least terminal. For evaluating the signaling sequences transmitted by the terminals, the base station includes a device for correlating a received signaling sequence and for detecting the pulse evolving from a received and correlated signaling sequence. A terminal generates a signaling sequence by folding two code sequences.

5 Claims, 4 Drawing Sheets

WIRLESS NETWORK

BACKGROUND OF THE INVENTION

The invention relates to a wireless network with at least one base station and a plurality of associated terminals for exchanging user data and control data.

The document "ETSI SMG2, Meeting No. 24, Cork Ireland, 1–5 December 1997, Tdoc SMG2 359/97, Concept Group Alpha-Wideband Direct-Sequence CDMA (WCDMA), EVALUATION DOCUMENT (3.0), Part 1: System Description, Performance Evaluation" proposes a radio network operating on the basis of the CDMA (CDMA=Code-Division Multiple Access) method. The radio network comprises a plurality of radio cells with a their respective base station and terminals or mobile stations located in these radio cells. After the registration and synchronization of a terminal, for example, in the case of a request for a user channel, a terminal transmits a random access burst via a random access channel (RACH). The random access burst comprises a preamble part and a data part. The preamble part comprises 16 symbols (preamble sequence) which is spread by an orthogonal Gold code (preamble code). The Gold code contains 256 chip intervals. The data part contains a field with an identification for the terminal, a field for featuring the requested service (short packet transmission, dedicated-channel set-up etc.), an optional field for data packets (optional user packet) and a CRC field for error detection. A random access burst received by a base station is applied, via a matched filter, a preamble correlator and a peak detector, to a circuit section which estimates the time delay of the data part and controls a RAKE circuit for evaluating the data part. Thus, in this case use is made of peak detection based on a correlation, and subsequent message decoding. 80 random access channels are available to the terminals assigned to a base station. These channels are determined by 16 different preamble codes and 5 different transmission instants. If two or more terminals transmit via the same random access channel, i.e. the same preamble code and the same transmission instant are chosen, a collision is bound to occur and the information transmitted by the terminals cannot be evaluated correctly by the base station. Such collisions are likely notably in the case of high traffic loads.

SUMMARY OF THE INVENTION

It is an object of the invention to provide a wireless network in which a terminal differently exchanges signaling information with the base station to which it is assigned.

The object is achieved by means of a wireless network of the kind set forth, which is characterized in that the base station is arranged for transmitting the start time of at least one signaling sequence of at least one terminal, and in that the base station includes a device for correlating a received signaling sequence and for detecting the pulse evolving from a received and correlated signaling sequence, and in that a terminal is arranged for producing a signal sequence by convolution of two code sequences.

In the context of the present application a wireless network according to the invention is to be understood to mean a network with a plurality of radio cells in which a respective base station and a plurality of terminals transmit control data and user data in a wireless manner. A wireless transmission is intended for transmitting information, for example via radio, ultrasound or infrared channels.

After registration and synchronization, a terminal must request the assigned base station for a given user channel for transmitting user data. Such a user channel may be, for example, a dedicated user channel (for example, for the transmission of speech) either between the base station and the terminal or between two terminals. The channels are assigned by the base station. In accordance with the invention, a terminal transmits a request, for example, for a dedicated user channel via a signaling channel assigned by the base station. The base station should provide the terminal with at least the start time of a signaling sequence possibly known in advance. It is alternatively possible that, in addition to the start time, the terminals are also assigned one of a plurality of signaling sequences. A signaling sequence of this kind is a Gold or Kasami sequence having suitable autocorrelation and cross-correlation properties. The base station includes a device (for example, a matched filter) in which the received signaling sequences are correlated. The pulse resulting from the correlation is detected and assigned to a terminal. Since collisions are avoided in the network according to the invention because of the different start times of the signaling sequences and because no message decoding is performed after peak detection based on a correlation, but the occurrence of the pulse resulting from the signaling sequence is considered a signaling request, in comparison with the state of the art a signaling detection can be performed in a more robust and faster manner, notably in the case of high traffic loads.

To detect a signaling sequence, a specific time interval is selected for peak detection in dependence on the start time of the signaling sequence and on the channel properties. Such a time interval is referred to as a detection window. The length or duration and the start time of the detection window must be chosen so that peak detection is possible. The detection windows are smaller than the duration of the random access bursts known from the state of the art. Thus when the signaling is used according to the invention, many terminals can transmit a signaling request within a brief period of time.

To transmit a signaling sequence after the registration and synchronization, a terminal in a radio cell always has the same start time in relation to a reference frame as long as the base station does not explicitly change this start time. A signaling channel is thus permanently occupied for a terminal. Because many of such start times may occur in the reference frame of short duration (for example, 10 ms) and because all the terminals of a radio cell use the same signaling sequence, the permanent assignment of a start time and a signaling sequence to a terminal requires only few network resources.

The signaling sequences of all the terminals in a radio cell have different start times. In the simplest case the same signaling sequences are used by each terminal. The signaling sequences may therefore partly overlap, because the length of a sequence is usually greater than the spacing of two successive start times.

Another advantage of the network according to the invention is provided by the reliability of the recognition of a signaling request. A detectable pulse is generated practically always after the transmission of a signaling sequence. This is because interference signals and channel noise may cause "artificial" pulses at the output of the matched filter. It is very unlikely that they reduce the amplitude of the pulses at the output of the matched filter upon reception of an actually transmitted signaling sequence. In the worst case (for example, in the case of disturbances), a false alarm is triggered if the amplitude of the noise or interference signal exceeds the detection threshold without a signaling sequence having been transmitted When the length is extended and the amplitude of a signaling sequence is kept the same, the false alarm rate (FAR) of the signaling sequence can be reduced. A longer signaling sequence, however, implies larger circuitry. In order to keep the circuitry for an extended signaling sequence smallest possible, it is advantageous to generate the signaling sequence in two steps. For this purpose, a first code sequence is concatenated to a second code sequence or convoluted. As a first code sequence can be used a Barker sequence having 13 time intervals and as a second code sequence can be used a Gold sequence having 256 time intervals. The concatenation of these two code sequences having each a good autocorrelation function provide a good autocorrelation property of the signaling sequence resulting from the concatenation.

For the two code sequences may also be selected sequences differing from the Gold sequence with 256 time intervals and the Barker sequence with 13 time intervals. For selecting these two sequences, the autocorrelation property of the resulting signaling sequence after the convolution of these two code sequences is decisive.

For detecting such a signaling sequence comprising two code sequences, a base station includes two series-arranged matched filters or one matched filter and one mismatched filter further down in the circuit for generating at least one pulse after a signaling sequence has been received from two convoluted code sequences and one peak detector. During a certain detection window, whose start time and duration are determined by the channel properties and the start time of a signaling sequence, the peak detector is arranged for detecting at least a peak assigned to a terminal.

These and other aspects of the invention are apparent from and will be elucidated with reference to the examples of embodiment described hereinafter.

DESCRIPTION OF THE PREFERRED EMBODIMENTS

Figure 1:
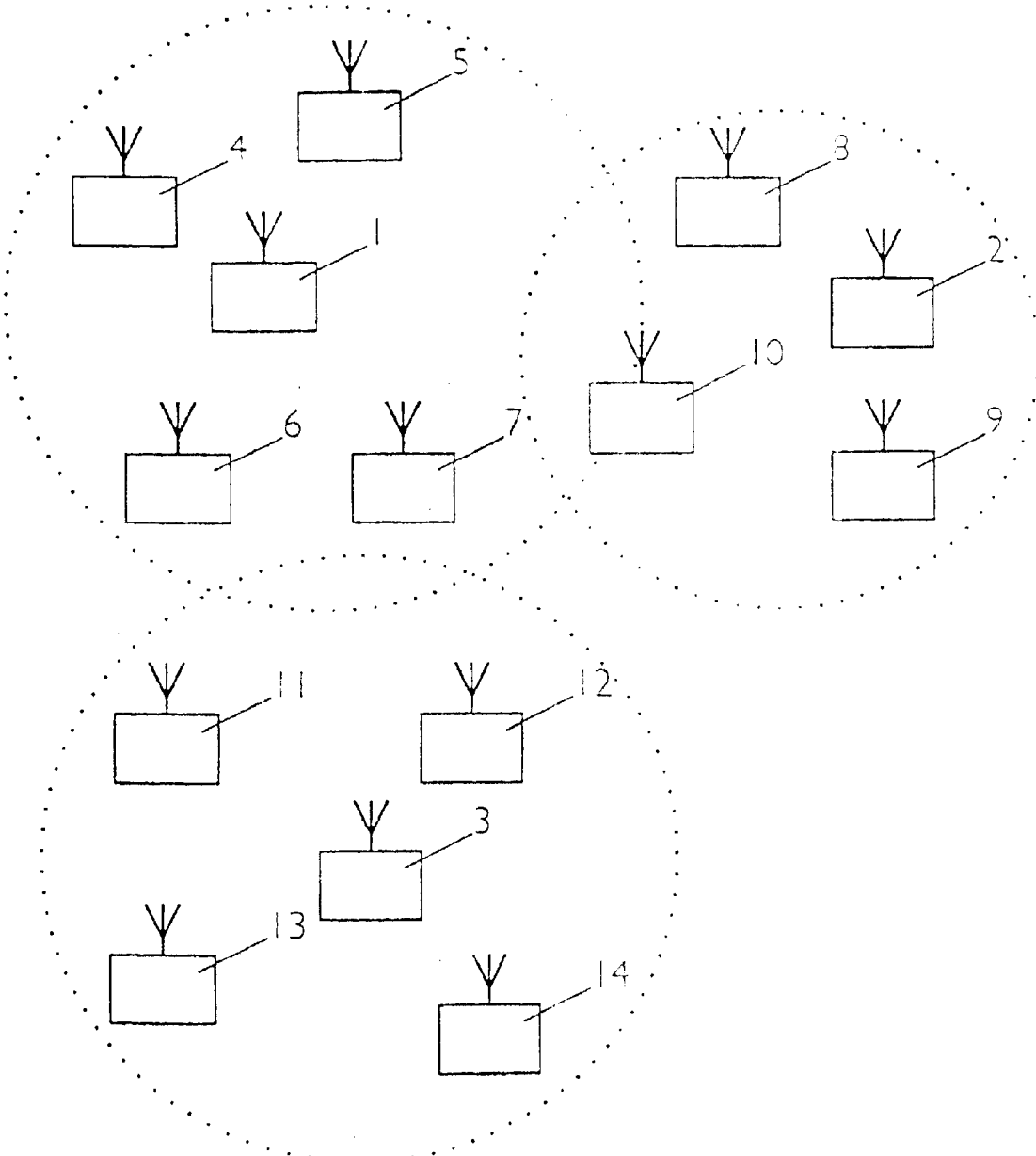
FIG. 1 shows a wireless network with a plurality of base stations and terminals.

FIG. 1 shows a wireless network, for example, a radio network with a plurality of base stations 1 to 3 and a plurality of terminals 4 to 14. A base station 1 to 3 is assigned certain terminals 4 to 14. In the example shown in FIG. 1, the base station 1 is assigned the terminals 4 to 7, the base station 2 the terminals 8 to 10 and the base station 3 the terminals 11 to 14. An exchange of control data takes place at least between the base station and the terminals. An exchange of user data can take place between the base station and the terminals as well as directly between the terminals. In both cases the link for the transmission of user data is established by the base station. The terminals 4 to 14 are usually mobile stations which are controlled by a stationary base station 1 to 3. The base station 1 to 3, however, may also be mobile.

In the wireless network, for example, radio signals are transmitted in conformity with the FDMA, TDMA or CDMA method (FDMA=Frequency-Division Multiple Access, TDMA=Time-Division Multiple Access, CDMA= Code-Division Multiple Access), or in conformity with a combination of these methods.

According to the CDMA method, being a special code spreading method, binary information (data signal) originating from a user are modulated each time with a different code sequence. Such a code sequence comprises a pseudo-random square-wave signal (pseudo-noise code) whose rate also referred to as chip rate is generally significantly higher than that of the binary information. The duration of a square-wave pulse of the pseudo-random square-wave signal is referenced chip interval $T_c$. $1/T_c$ is the chip rate. The multiplication or modulation of the data signal with the pseudo-random square-wave signal causes a spreading of the spectrum by the spreading factor $N_c=T/T_c$, where T is the duration of a square-wave pulse of the data signal.

To the base stations are assigned specific radio cells in which the data traffic with the relevant terminals located in the radio cells takes place. When the terminal moves from one radio cell to another, the allocation of the terminal is transferred from one base station to another in conformity with given specifications. Such a terminal can then simultaneously exchange data with the base stations of both radio cells upon changing over from one radio cell to another. This is referred to as a soft hand-over. A radio cell is denoted by a dotted circle in FIG. 1.

User data and control data are transferred between at least one terminal and a base station by way of channels specified by the base station. The radio link from the base station to the terminals is referred to as a down-link and that from the terminals to the base station as an up-link. Thus, data are transmitted from the base station to the terminal via down-link channels, whereas data are transmitted from the terminals to the base station via up-link channels. For example, there may be provided a down-link control channel which is used to distribute control data from the base station to all the terminals prior to the establishment of a link. A channel of this kind is referred to as a down-link distribution control channel or broadcast control channel. In order to transmit control data prior to the establishment of a link from a terminal to the base station, for example an up-link control channel can be used which is assigned by the base station, but can also be accessed by other terminals. An up-link channel which can be used by several or all the terminals is referred to as a common up-link channel. After a link has been set up, for example between a terminal and the base station, user data are transmitted via a down-link channel and an up-link channel. For the direct transmission of use data between two terminals use is made of channels which are referred to as peer-to-peer user channels. Channels that are established only between one transmitter and one receiver are referred to as dedicated channels. As a rule, a user channel is a dedicated channel that can be accompanied by a dedicated control channel for the transmission of link-specific control data.

A channel is defined by a frequency range, a time range and, for example, in the case of the CDMA method, by a spreading code. In order to enable the exchange of user data between the base station and a terminal, it is necessary to synchronize the terminal with the base station. For example, from the GSM system (Global System for Mobile communications), in which a combination of FDMA and TDMA methods is used, it is known that after the determination of a suitable frequency range on the basis of specified parameters, the time-dependent position of a frame (frame synchronization) is determined in order to sequence the transmission of the data. Such a frame is always required for the data synchronization of terminals and base station in the case of the TDMA, FDMA and CDMA methods. A frame of this kind may include several sub-frames or form a super-frame together with a plurality of other, successive frames. For reasons of simplicity the following description is based on the assumption of one frame which is referred to as a reference frame.

In order to enable frame synchronization, all the terminals must be synchronized with a base station by means of pulses transmitted by the base station. When no code spreading method (for example, CDMA method) is used (for example a TDMA method is used), the pulse duration corresponds exactly with the time interval required for the transmission of one bit. When a code spreading method is used indeed, the pulse duration corresponds with one chip interval. A bit interval then corresponds with a plurality of chip intervals. The frame synchronization requires the transmission of a special pulse sequence by the base station. The start time of the pulse sequence corresponds to the start time of a frame.

Hereinafter it will be assumed that the terminals have already been synchronized with the base station and registered there. Before a terminal (for example, one of the terminals 4 to 7 in FIG. 1) can transmit and receive user data, it must be allocated a user channel by the associated base station (for example, the base station 1 in FIG. 1) for a down-link and an up-link connection or a peer-to-peer user channel. To this end, the base station (for example, the base station 1 in FIG. 1) transmits to the assigned terminals (for example, the terminals 4 to 7) control data via a downlink broadcast control channel during a frame that can be selected at random. These control data inform the terminals of the instant (sequence start time) relative to the frame, at which the terminals may transmit a special signaling sequence. Such a signaling sequence transmitted by a terminal is a pseudo-random square-wave signal and indicates that the relevant terminal requests a user channel. Therefore, in order to transmit a signaling sequence, the base station allocates to each terminal an uplink signaling channel via which signaling sequences are transmitted. In order to limit the transmission of control data, the base station can execute the allocation of the signaling sequence and the sequence start time for each terminal only once. This can take place, for example during the registration of a terminal at the assigned base station. The allocation of the sequence start times, however, can also take place (as described in detail hereinafter) in dependence on the different channel properties of the links between base station and terminals. A signaling channel according to the invention is realized by the given signaling sequence and its start time.

All the terminals assigned to a base station transmit the same signaling sequence, be it at different instants (sequence start times). Consequently, different base stations allocate different signaling sequences to their assigned or registered terminals. In this respect it suffices, however, when only the neighboring base stations have respective, different signaling sequences. When a terminal is registered with two base stations, for example, upon a change-over from one radio cell to another, it transmits the signaling sequence specified by the base station from which a user channel is requested.

A base station includes a single matched filter and a subsequent peak detector for the detection of the signaling sequences transmitted by the terminals. The matched filter is clocked at a clock rate that is at least equal to the maximum chip rate when use is made of code spreading or equal to the maximum bit rate if code spreading is not used. The terminals transmit signaling sequences, which have a suitable autocorrelation property. This means that the pulses, which occur at the output of the matched filter and stem from successive signaling sequences from different terminals, can be unambiguously detected by the peak detector within one detection window. The choice of the clock rate in dependence on the maximum chip rate or bit rate and a signaling sequence having suitable autocorrelation properties enables a minimum time-dependent distance between the start times of the successive signaling sequences. Furthermore, the signaling sequence should also have a suitable cross-correlation property, i.e. there should be little correlation only with other signals to be transmitted in the network. Thus, on the one hand, the other signals transmitted in the network and received by the matched filter are interpreted as a negligible noise signal by the peak detector, whereas, on the other hand, the signaling sequences are interpreted as a negligible noise or interference signal by other circuit elements in the base station which process the other signals transmitted in the network. A signaling sequence of this kind, having suitable autocorrelation properties and cross-correlation properties, is, for example the Gold and Kasami sequence which is known from the book "J. G. Proakis: Digital Communications by J. G. Proakis, Third Edition, McGraw-Hill International Editions, 1995, pp. 724 to 729".

The pulses appearing at the output of the matched filter are a measure of the energy of the signaling sequences. The length and the amplitude of the signaling sequence, which are low as opposed to the other signals to be transmitted, thus determine the pulse level at the output of the matched filter.

The sequence start time of a signaling sequence should be defined by the base station, so that the matched filter in the base station generates a pulse after detection of a signaling sequence from a terminal assigned thereto in a predetermined detection window. This detection window has a duration or length $\delta$.

Figure 2:
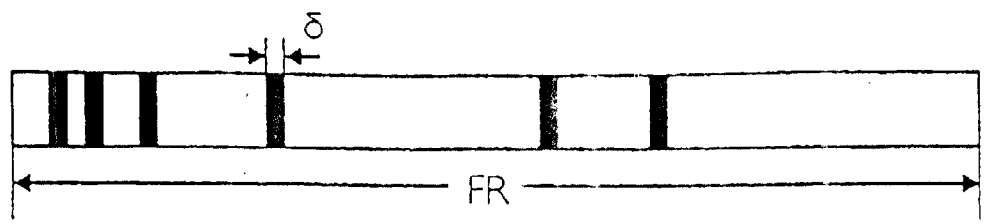
FIGS. 2 and 3 show sequences of detection windows for a matched filter used in the base station in relation to a reference window.

The signaling sequences can, in principle, be transmitted at arbitrary sequence start times. A sequence start time is linked with the appearance of a pulse at the output of the matched filter. The detection commences after the transmission of a signaling sequence and a delay, which is imposed by the channel property of a link between at least one terminal and a base station. A channel property is to be understood to mean the physical characteristics of a channel. A channel property is, for example, the result of the distance between a terminal and a base station. Consequently, it may be that the peak detector utilizes detection windows of different widths for the various terminals. For the sake of simplicity, however, a uniform width of the detection window is chosen herein. FIG. 2 shows the succession of arbitrarily occurring detection windows of duration $\delta$ in relation to the reference frame of length FR. On the basis of a received signaling sequence the matched filter usually generates a pulse sequence with a main pulse and several subsidiary pulses which are usually symmetrically distributed around the main pulse. The amplitude of the subsidiary pulses is regularly lower than the amplitude of the main pulse.

The various main pulses generated by the matched filter must have an adequate guard time in order to ensure that the pulse sequences from the various terminals, appearing at the output of the matched filter and distorted by the channel, do not overlap so that unambiguous detection is impossible. In the case of a given overlap, the base station cannot unambiguously assign the pulses to a terminal. The width or duration δ of the detection window, therefore, must be at least equal to the width of the main pulse as it occurs without being influenced by the channel, plus an additional channel-dependent safety interval. This also provides the distance between successive equal signaling sequences. However, the time-dependent distances of two different signaling sequences from different base stations need not be taken into account, because the weak correlation ensures that a peak detector connected downstream of the matched filter detects a signaling sequence from another base station or radio zone as non-disturbing noise.

Figure 3:
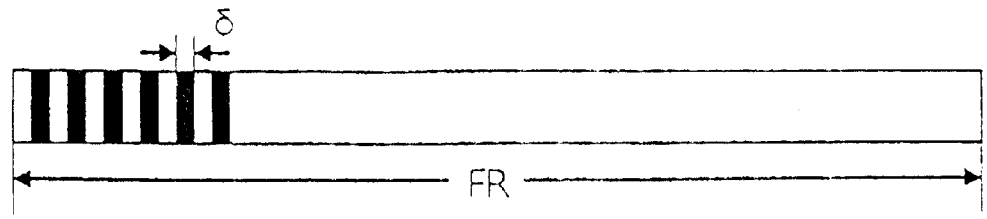

To enable the transmission of as many signaling sequences as possible within a predetermined time interval, according to the invention the spacing of the sequence start times may be optimized. This means that the width of the detection window is always determined in dependence on the channel properties between a terminal and the base station. Another possibility according to the invention, which can be realized in a simpler manner, is that the signaling sequences are successively transmitted with a constant spacing. When the constant spacing is determined, the poorest channel properties should be taken into account. FIG. 3 shows the continuously successive detection windows in relation to the reference frame of length FR, occurring as a result of the signaling sequences transmitted with a predetermined constant spacing.

Figure 4:
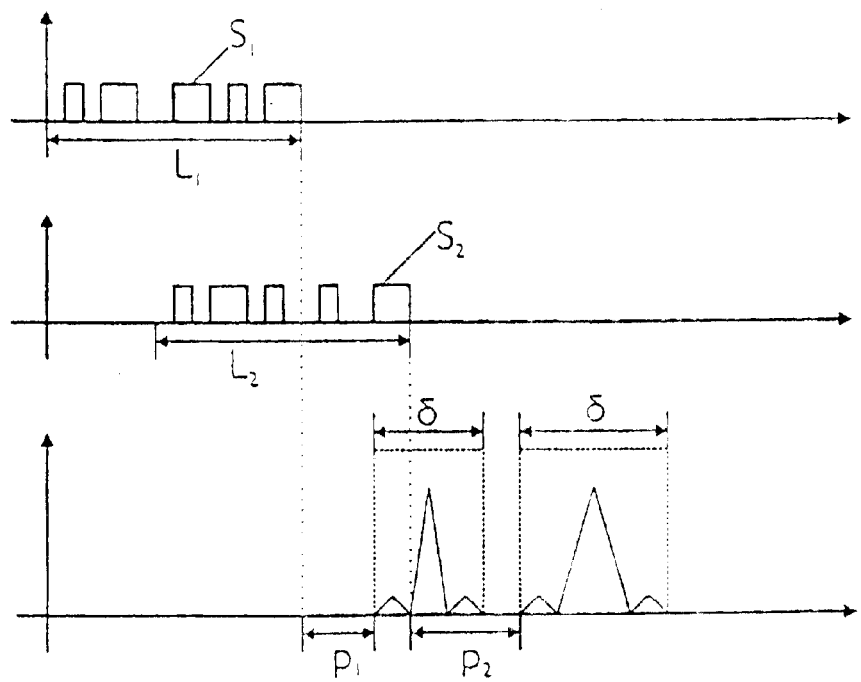
FIG. 4 shows two examples of signaling sequences transmitted by two terminals and their respective detection windows.

FIG. 4 shows, by way of example, two signaling sequences $S_1$ and $S_2$ which have the sequence duration or sequence length $L_1$ and $L_2$, respectively. After a delay time $p_1$ and $p_2$, imposed by the channel properties, the detection operation or the detection window of length δ commences. A main pulse and subsidiary pulses associated with a signaling sequence occur in such a detection window.

The length δ of the detection window is determined notably by three factors (channel properties). Firstly, the accuracy of the estimate of the propagation delay of the data to be transferred from the terminals to the base station must be taken into account, and secondly the delay spread characteristic based on multipath propagation, and thirdly the autocorrelation properties of the signaling sequences of the terminals.

In a radio cell the terminals are usually located at different distances from the base station. This leads to different propagation delays of the signaling sequences transmitted by the terminals. The propagation delay between the terminal $MT_i$ and the base station B should be equal to $p_i$ and the length of the signaling sequence should be equal to L. When the base station expects a pulse for the terminal $MT_i$ at the output of the matched filter at the instant $t_i$, it instructs the terminal $MT_i$ to start the transmission of the signaling sequence at the instant $t_i$-$p_i$-L. However, because of the limited accuracy of the estimate of the propagation delay $p_i$, the pulse at the output of the matched filter is inherently inaccurate. This inaccuracy of the estimate of the propagation delay $p_i$ must be compensated by a sufficiently long detection window δ. When the maximum inaccuracy of the estimate amounts to j for all the terminals, the detection window must be larger than j.

The data between a terminal and a base station are usually not transmitted via only one radio link, but via several links (multipath propagation). Because of reflection and deflection effects, the signal transmitted from a terminal to the base station travels along different paths and the signals resulting therefrom and traveling along different paths are received by the base station at different instants. Consequently, at the output of the matched filter not only a single main pulse appears for a signaling sequence, but also further main pulses. These further main pulses evolve at the output of the matched filter because of signals produced by the multipath propagation and grouped around the actual main pulse. The actual main pulse arises at the output of the matched filter from the actual received signaling sequence. Therefore, the length δ of the detection window must be larger than a window of length w which contains the actual main pulse and the further main pulses. It is to be noted that even in the absence of multi-path propagation, not only an actual main pulse occurs at the output of the matched filter, but also subsidiary pulses. However, because of the described suitable autocorrelation properties, the amplitude of the subsidiary pulses is much lower than the amplitude of the main pulse.

The autocorrelation property of the signaling sequence is the measure for the width of the main pulse and the minimums and maximums of the subsidiary pulses at the output of the matched filter (without taking the channel properties into account). In the case of a Gold or Kasami sequence, the main pulse at the output of the matched filter is approximately equal to the energy of the signaling sequence, as stated above. The amplitude of the main pulse is then much higher than that of the subsidiary pulses. The energy of the signaling sequence is thus determined by its amplitude and duration or length. In order to reduce the interference with other signals, the amplitude of the signaling sequence (for example, a Gold or Kasami sequence) must be significantly smaller than that of the other signals. However, in order to enable detection of a signaling sequence by means of the matched filter, the signaling sequence must be sufficiently long. The duration of the detection of a signaling sequence is thus prolonged and so is the assignment by the base station of user channels to the terminal that has transmitted a signaling sequence (prolongation of the signaling time). The length of a signaling sequence thus influences the autocorrelation property of the signaling sequence as well as the signaling time. When the autocorrelation function for a given signaling sequence is sufficiently large within a time interval q, δ must be larger than q.

It is to be noted that the length or duration δ of the detection window must be chosen to be equal to the sum of the values of j, w and q:

$$\delta = j + w + q.$$

Thus far, a description has been given of the case where the duration δ of the detection window is proportioned, so that only a single signaling sequence can be detected. This means that a base station receives a binary information signal or 1-bit information signal. This binary information signal indicates whether a terminal, having transmitted the signaling sequence, requests a new user channel (pulse present at the output of the matched filter for the duration of the detection window) or no user channel (pulse absent at the output of the matched filter for the duration of the detection window). Hereinafter the extension of the transmission from a 1-bit to an n-bit information signal (n exceeds 1 and is an integer) will be described. A terminal then transmits the same signaling sequence not once but several times in succession within each reference frame in order to make an n-bit information signal available to the base station. This extension from 1-bit to n-bit information is achieved by prolongation of the detection window in that the duration or length of the detection window is increased by the factor n for each terminal concerned. During the occurrence of the detection window that is enlarged n times, n signaling sequences from a terminal can thus be detected. The terminal transmitting an n-bit information signal (signaling data) utilizes the same signaling sequences whose start times have been shifted each time by the value δ. A transmitted signaling sequence then indicates, for example a "1" and a non-transmitted signaling sequence indicates a "0".

Figure 5:
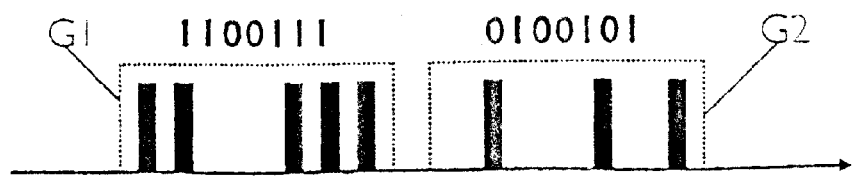
FIG. 5 shows the position of the peaks arisen from the detection of signaling sequences for transmitting n-bit signaling information.

FIG. 5 shows an example of the position of pulses detected from identical signaling sequences. A first group G1 of pulses is associated with signaling sequences of a first terminal and a second group G2 of pulses is associated with signaling sequences of a second terminal. The 7-bit information "1100111" results from the group G1 and the information "0100101" from the second group G2.

The transmission of n-bit information by a terminal enables various signaling applications. For example, the information "000", corresponding to non-transmission of three successive signaling sequences, may mean that the terminal does not request a user channel. The information "001" may mean that the terminal requests an 8-kbit/s user channel. Two non-transmitted signaling sequences and one transmitted signaling sequence produce the information "001". A terminal can express the request for a 64-kbit/s user channel by way of the information "010" and the request for a 144-kbit/s user channel by way of the information "011".

The matched filter in the base station is then arranged for the reception of 1-bit as well as n-bit information, because the same signaling sequence is received in both cases. In these two cases the only difference resides in the post-processing of the pulses detected by the matched filter. In the former case information processing takes place after the period δ for the detection of a signaling sequence and in the second case after the period nδ for the detection of n signaling sequences.

A further aspect of the invention concerns the increase of the number of signaling channels. The number of signaling channels of a base station is limited to the value FR/δ when a single signaling sequence is used; therein, FR denotes the length of the reference frame and δ the length of a detection window. In this respect it is assumed that only 1-bit information is transmitted and that each detection window has the same length δ. Should a base station wish to allocate more signaling channels than given by the value FR/δ, it can assign the terminals different signaling sequences instead of only a single signaling sequence. For example, during one reference frame 100 identical signaling sequences can be detected by the matched filter. However, if 120 terminals wishing to transmit a signaling sequence are present in the radio cell, it is impossible to use the same signaling sequence for all of said 120 terminals. Therefore, for example, 60 terminals can transmit a first signaling sequence and the other 60 terminals a second signaling sequence; these sequences can then be detected by two different matched filters in the base station. It is also to be noted that the sequence start times of the different signaling sequences are independent of one another, so that they need not be co-ordinated. It is only necessary to tune the start times of the same signaling sequences to one another.

When a signaling sequence is transmitted to a base station, it should be borne in mind that the amplitude of the signaling sequence (compare FIG. 4) is neither too high or too low, because with certain methods (for example, CDMA method) the amplitude of the transmitted signaling sequence is to be adapted to the distance to the assigned base station. A too high amplitude, for example in a CDMA system means that interference with other signals may arise. As a result, the capacity of the whole system is reduced. A too small amplitude means that a signaling sequence cannot be received correctly, because it cannot be detected correctly in the base station as a result of the interference by other signals and/or noise signals.

To solve this problem, a terminal can transmit a signaling sequence with a small amplitude which can sufficiently well be received by a base station under normal conditions. When this signaling sequence has been detected by the assigned base station, the base station assigns a requested channel to the terminal. After reception of the message, the terminal no longer transmits signaling sequences.

When the terminal does not receive a return message from the assigned base station after a predefined period of time after a signaling sequence has been transmitted, it transmits a new signaling sequence with a higher amplitude. When the terminal does not receive an assignment from the base station within the predefined period of time, a further signaling sequence is transmitted with again a higher amplitude. This process is repeated until a predefined maximum value for the amplitude has been reached, or the terminal has received a channel assignment from the base station before that time.

In the case where a terminal has not received a return message for a signaling sequence with the maximum permitted amplitude after the predefined period of time, this whole process is repeated after a certain random time or a signaling is dispensed with.

When the amplitude of the signaling sequence is smallest possible, a further problem may arise. This problem relates to the rise of the false alarm rate (FAR). A false alarm rate is equal to the probability that a peak detector connected downstream of the matched filter detects a pulse although no signaling sequence has been transmitted.

This problem of the rise of the false alarm rate may be solved in that the base station does not immediately assign a channel to a terminal after a signaling sequence has been detected, but that the base station waits with the assignment until a plurality of signaling sequences (h signaling sequences, with h>1) have been detected in g (g>1) successive frames in the provided detection window. When the false alarm rate for one detected pulse in the base station is equal to p, the false alarm rate for h successive detected pulses will be reduced to $p^h$.

The invention can be implemented as an additional circuit part in each existing mobile radio system such as, for example, GSM system or a UMTS mobile radio system (UMTS=Universal Mobile Telecommunication System) based on WB-CDMA or CD/TDMA. FIGS. 6 to 9 show a receiver (FIG. 6) and a transmitter (FIG. 7) of a base station and a receiver (FIG. 8) and a transmitter (FIG. 9) of a terminal.

Figure 6:
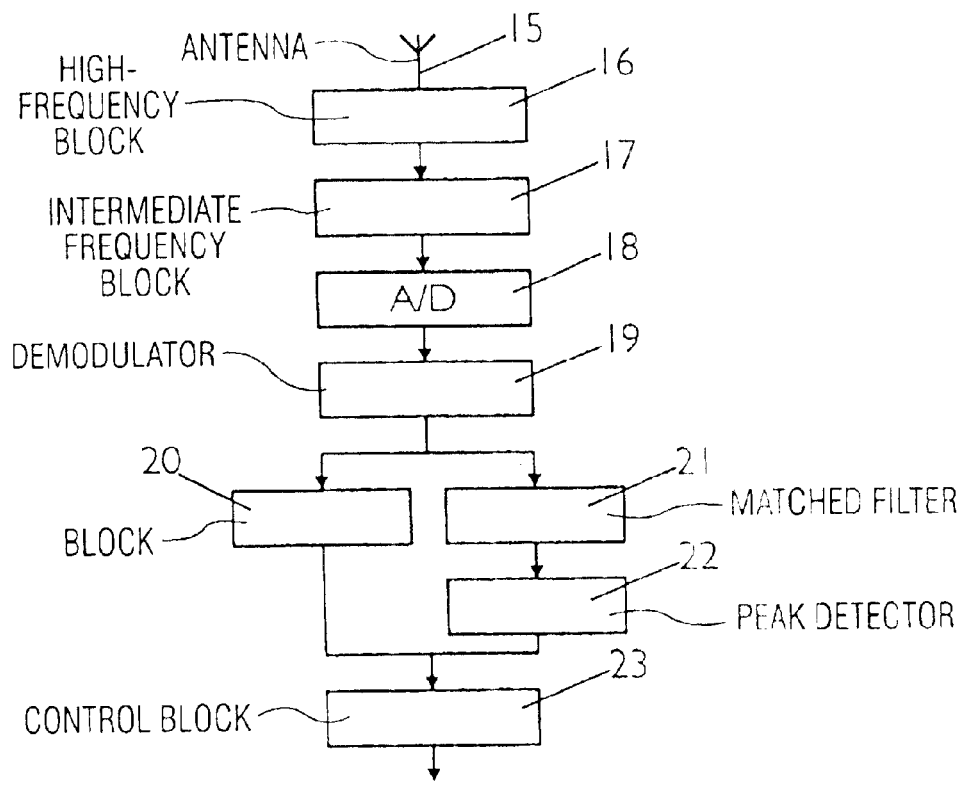
FIG. 6 shows a receiver of a base station and FIG. 7 shows a transmitter of a base station.

The block diagram of a receiver of a base station shown in FIG. 6 has as known elements (for example, from the GSM mobile radio system or a CDMA system) an antenna 15, a high-frequency block 16, an intermediate-frequency block 17, an analog/digital converter 18, a demodulator 19 and a block 20 which executes, for example, the switching functions of channel demultiplexing, de-interleaving, channel decoding and, when a CDMA system is used, also a de-spreading. The control and user signals occurring in the baseband are applied to a channel access control block 23 which transfers the various signals to the respective units for further processing, for example, to a switching center. According to the invention, the receiver of the base station includes a matched filter 21 which checks the received signals to find whether there is a signaling sequence. If a signaling sequence has been detected during the expected period of time (detection window), that is, at least one pulse is generated, this is detected by a following peak detector 22 and announced to the channel access control block 23 which may be, for example, a processor. The channel access control block 23 leads this message to further control elements downstream in the circuit and not represented here, which then, for example, by means of generated control data, assign a user channel to the terminal via the transmitter of the base station.

The duration or length δ of the detection window may be fixedly predefined and may have been determined, for example, by measurements prior to the normal operation of the network. Alternatively, it is possible for the duration δ of the detection window to be individually determined for each terminal during operation. The duration δ of the detection window for a specific signaling sequence and of a terminal is in this case fed to the peak detector by a control element not further shown here after measuring results have been evaluated. In the GSM mobile radio system, for example, the distance between a base station and a terminal is evaluated on the basis of the signals received in the base station from the terminal.

The information processing of the pulses generated by the matched filter 21 and determined by the peak detector 22 is executed in the channel access control block 23. A specific detection window is assigned to a terminal. If at least one main pulse is detected in such a detection window, the channel access control block 23 establishes that there is a request for a user channel from the terminal. From this request and requests from further terminals and while considering the existing connections or assigned user channels, a control element not further shown here decides, after receiving the request from the channel access control block 23, whether a user channel can be rendered available to the requesting terminal. If an assignment of a user channel is possible, this user channel is determined and, after processing in the transmitter of the base station (FIG. 7) applied to the terminal via a broadcast control channel.

Figure 7:
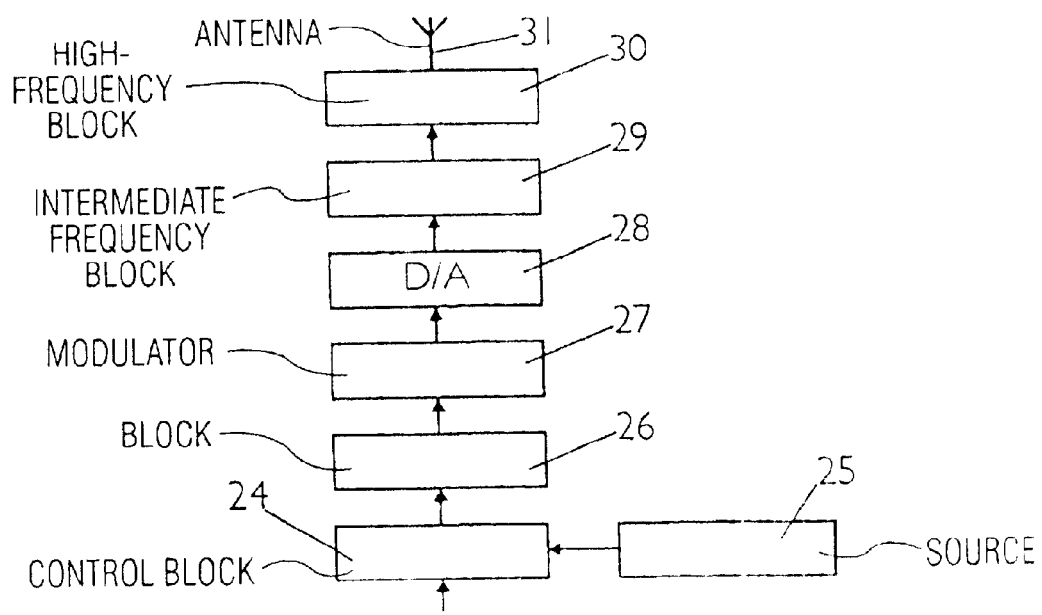

The transmitter of the base station represented in FIG. 7 also includes a channel access control block 24 which receives data from various sources 25. Such a source may be, for example, a switching center which produces user data, or a control element which supplies control data. For example, these control data may contain information about a user channel to be used for a terminal, which terminal has previously requested a user channel by means of a signaling sequence. The block 26 following the control block 24 carries out the switching functions of, for example, channel coding, interleaving, channel multiplexing and, when a CDMA system is used, also spreading. The output signal of the block 26 is applied to an antenna 31 via a modulator 27, a digital/analog converter 28, an intermediate-frequency block 29 and a high-frequency block 30. All the elements 25 to 31 may be elements known from existing mobile radio systems.

Figure 8:
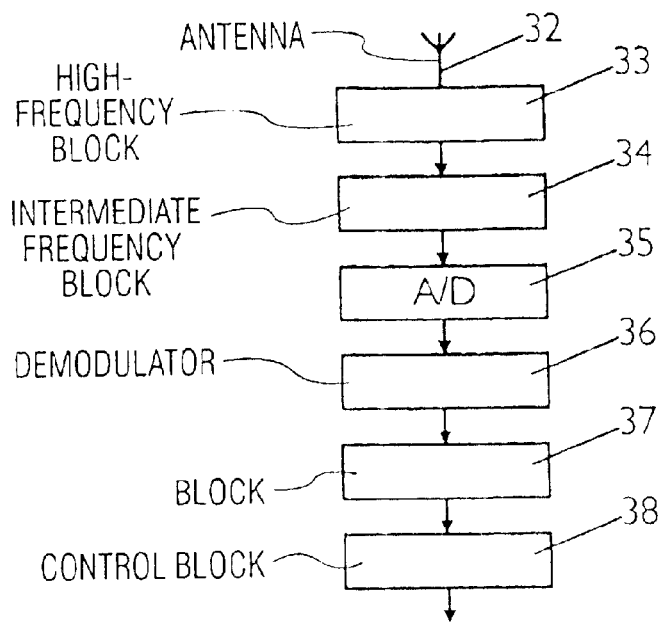
FIG. 8 shows a receiver of a terminal and FIG. 9 shows a transmitter of a terminal.

A block circuit diagram of a receiver of a terminal is shown in FIG. 8. This receiver includes as elements known from, for example, a GSM mobile radio system or a CDMA system, an antenna 32, a high-frequency block 33, an intermediate-frequency block 34, an analog/digital converter 35, a demodulator 36, a block 37 having several functions and a channel access control block 38 which supplies control and user data to various sinks (for example, low-frequency circuit for converting user data into speech data). The block 37 is charged with, for example, the switching functions of channel demultiplexing, de-interleaving, channel decoding and, when a CDMA system is used, de-spreading. The channel access control block 38 evaluates certain channels relevant to the terminal such as, for example, a user channel or a broadcast control channel. This information is transferred to certain other circuit elements in the terminal which are not further shown here. The channel access control block 38 takes from the broadcast control channel the information at which start time at least one signaling sequence can be transmitted. This information is transferred to at least one circuit element not further shown here.

Figure 9:
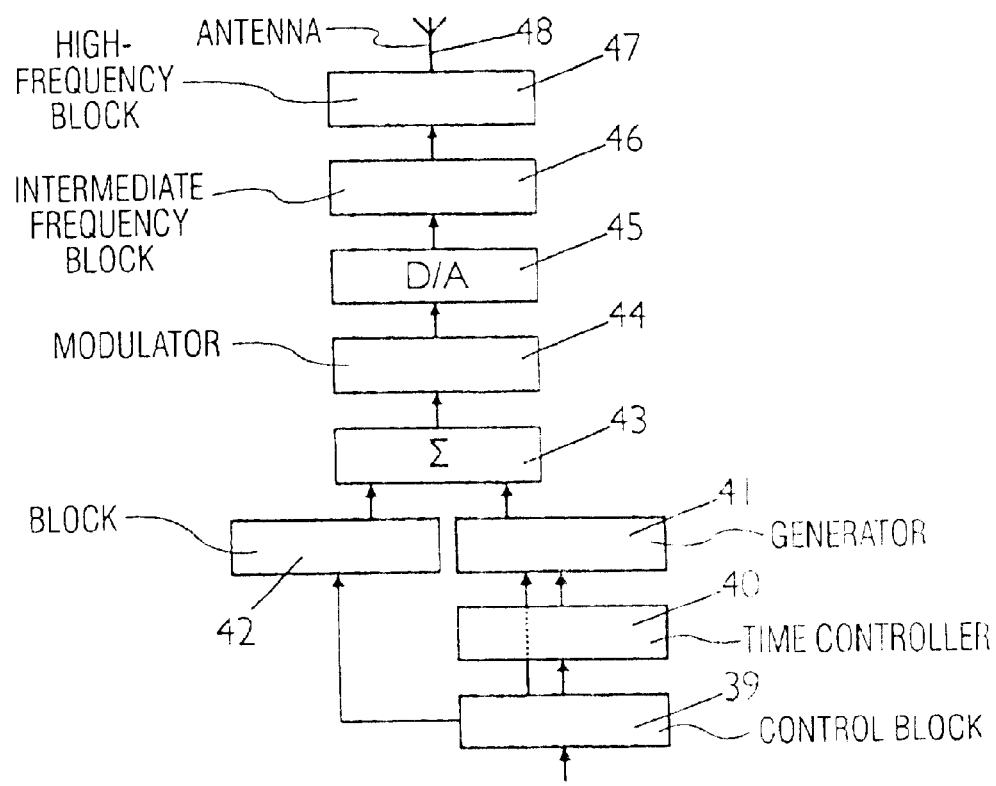

The terminal includes in a transmitter whose associated block circuit diagram is shown in FIG. 9, also a channel access control block 39 which controls the channel access. The channel access control block 39 delivers to a block 42, which executes the switching functions of channel coding, interleaving, channel multiplexing and, when a CDMA system is used, also spreading. Furthermore, the channel access control block 39 indicates to a time controller 40 the start time of a signaling sequence. The user data and control data are received from different sources by the channel access control block 39. Such a source may be, for example, a low-frequency circuit which produces speech data as user data, or a control element which supplies control data. For example, these control data may be information about the start time of a signaling sequence. The time controller 40 delivers time marks to a generator 41 for generating a signaling sequence. The time marks may be, for example, the starting and final instants of square-wave pulses of the signaling sequence. The generator includes a memory for storing various signaling sequences. The signaling sequence to be transmitted is selected from the channel access control block. Signaling sequences may be written, as appropriate, in the memory of the generator 41. The generator 41 and the time control element 40 are initialized after the information is received about the signaling sequence to be used and the start time of the signaling sequence. When no change of the signaling sequence and/or start time is indicated by the associated base station, a further initialization of generator 41 and time controller 40 is not necessary.

The user data and control data processed in the block 42 are supplied to a superposition circuit 43 which further receives output signals of the generator 41. The output signal produced by the superposition circuit 43 is transmitted via a modulator 44, to a digital/analog converter 45, to an intermediate-frequency block 46 and to a high-frequency block 47, which radiates by an antenna 48 the signals formed in the high-frequency block.

As observed hereinbefore, the length and the amplitude of a signaling sequence is always to be smallest possible to produce the interference with other signals and reduce the duration of the detection. When the length and/or amplitude of the signaling sequence is reduced, an increased false alarm rate (FAR) may occur. A false alarm rate is equal to the probability that the peak detector connected downstream of the matched filter detects a pulse although no signaling sequence has been sent.

To keep the false alarm rate smallest possible, preferably a signaling sequence of 4096 chip intervals should be selected. The generation of signaling sequences having such a length means much circuitry and cost compared with a Gold sequence with 256 chip intervals as a signaling sequence, because larger memories are necessary in the terminal and the base station and because particularly the matched filter in the base station becomes too complex. In order to reduce this circuitry and cost, the signaling sequences in a terminal are generated in at least two steps. In a first step a first code sequence is generated which is concatenated to a second code sequence in a second step. The concatenation of the two code sequences produces the signaling sequence. The concatenation provides that the matched filter in the base station is realized with two stages which leads to a reduction of the complexity.

For example, as a first code sequence can be used a Barker sequence with 13 time intervals and as a second code sequence a Gold sequence with 256 time intervals. The concatenation provides a signaling sequence of 3328 chip intervals. The concatenation provides that the good autocorrelation properties of the Gold sequence comprising 256 time intervals is passed on to the concatenated signaling sequence. This is due to the fact that the Barker sequence has an optimum aperiodic autocorrelation function and, therefore, the good autocorrelation properties of the Gold sequence are hardly changed.

Mathematically speaking, the concatenation of the two code sequences can be expressed in the following manner. The first code sequence, which is a Barker sequence with 13 time intervals, is referenced b(t) and the second code sequence, which is a Gold sequence with 256 time intervals, is referenced g(t). T is the duration of one chip interval. A sample value of the Barker sequence appears at the instant t=i*256*T(i*256*T) i=0, 1, . . . , 12 and a sample value of the Gold sequence at the instant t=j*T (j=0, . . . , 255). The concatenation of these two code sequences b(t) and g(t) may mathematically be expressed as folding b(t)*g(t). Such a folding is equivalent to a spreading of each sample value of the Barker sequence with a Gold sequence.

Generating such a signaling sequence in two steps from a Barker sequence and a Gold sequence may be effected in the generator 41 of the transmitter of a terminal shown in FIG. 9. The generator 41 spreads a Barker sequence with the Gold sequence and thus delivers a signaling sequence of 3328 chip intervals to the superposition circuit 43.

For detecting such a signaling sequence from two code sequences, it is necessary to have two series-connected matched filters in a base station. The output signal of the second matched filter is applied to the peak detector. The first matched filter is adapted to the second code sequence (Gold sequence with 256 time intervals) and the second matched filter to the first code sequence (Barker sequence with 13 time intervals). When a signaling sequence occurs, the second matched filter produces its autocorrelation function, which is applied to the peak detector for finding the main pulse.

The matched filter 21 shown in FIG. 6 is to be extended by a further second matched filter to detect a signaling sequence having two code sequences. The first matched filter 21 is to be adapted to the second code sequence and the second matched filter, not further shown in FIG. 6, which is to be inserted between the first matched filter 21 and the peak detector 22, is to be adapted to the first code sequence.

To further improve the detectability of the signaling sequence, the second matched filter can be replaced by a mismatched FIR filter whose length is equal to or larger than the number of time intervals of the first code sequence (Barker sequence). The FIR filter coefficients can be determined so that the ratio of the main maximum to the sum of all the sub-maximums of the filter output signal is maximized to the first code sequence (Barker sequence). This ratio can also be expressed in a different mathematical form (for example, quadratic).

What is claimed is:

1. A wireless network comprising:

at least one base station;

a plurality of assigned terminals for exchanging user data and control data; wherein the at least one base station is configured to (1) have a predetermined time interval for detection of a signaling sequence, wherein the predetermined time interval is based on a start time of a signaling sequence for a terminal, transmission channel properties, and autocorrelation properties of the signaling sequences of the terminals (2) transmit a start time of at least one signaling sequence of at least one terminal, (3) detect a signaling sequence using the predetermined time interval (4) correlate a received signaling sequence, and (5) detect a pulse evolved from a received correlated signaling sequence and wherein a terminal is configured to generate a signaling sequence by folding two code sequences.

2. The wireless network as claimed in claim 1, wherein a first code sequence is a Barker sequence having 13 time intervals and a second code sequence is a Gold sequence having 256 time intervals.

3. The wireless network as claimed in claim 1, wherein a first base station includes two series-connected matched filters or one matched filter and one mismatched filter connected downstream of the matched filter for generating at least one pulse after a signaling sequence comprising two convoluted code sequences has been received and includes a peak detector and the peak detector is arranged for detecting at least a pulse assigned to a terminal during a specific detection window whose start time and duration are determined by the channel properties and the start time of a signaling sequence.

4. The wireless network as claimed in claim 1, wherein the transmission channel properties include an estimate of propagation delay and a delay spread characteristic based on multipath propagation.

5. The wireless network as claimed in claim 1, wherein a first base station includes two different matched filters for generating respective pulses after a first or a second signaling sequence is received.

* * * * *